(12) United States Patent
Lettmann et al.

(10) Patent No.: US 7,683,105 B2
(45) Date of Patent: Mar. 23, 2010

(54) MIXTURE CONTAINING A SOLVENT, WHICH CAN BE CURED WITH UV-A RADIATION, METHOD FOR ITS PRODUCTION, AND USE THEREOF

(75) Inventors: Bernhard Lettmann, Drensteinfurt (DE); Klaus-Udo Reize, Munster (DE); Egbert Nienhaus, Ascheberg (DE)

(73) Assignee: BASF Coatings AG, Munster (DE)

( * ) Notice: Subject to any disclaimer, the term of this patent is extended or adjusted under 35 U.S.C. 154(b) by 0 days.

(21) Appl. No.: 11/816,776

(22) PCT Filed: Jan. 28, 2006

(86) PCT No.: PCT/EP2006/050566

§ 371 (c)(1),
(2), (4) Date: Aug. 21, 2007

(87) PCT Pub. No.: WO2006/097386

PCT Pub. Date: Sep. 21, 2006

(65) Prior Publication Data

US 2008/0090935 A1   Apr. 17, 2008

(30) Foreign Application Priority Data

Mar. 18, 2005   (DE) .................. 10 2005 012 589

(51) Int. Cl.
*C08F 2/48* (2006.01)
*C08J 3/28* (2006.01)
*C08F 2/50* (2006.01)

(52) U.S. Cl. .............. 522/178; 522/153; 522/154; 522/150; 522/181; 522/182; 522/104; 522/71; 522/74; 427/140; 427/142; 427/299; 427/487; 427/508; 427/512; 427/517

(58) Field of Classification Search .............. 522/178, 522/181, 183, 153, 154, 150, 182, 104, 71; 427/140, 142, 299, 487, 508, 512, 517
See application file for complete search history.

(56) References Cited

U.S. PATENT DOCUMENTS

| | | | |
|---|---|---|---|
| 4,450,200 A | 5/1984 | Iwato et al. | |
| 4,537,926 A | 8/1985 | Kivel et al. | |
| 4,614,683 A | 9/1986 | Barsotti | |
| 2003/0157249 A1* | 8/2003 | Witte et al. | 427/327 |
| 2004/0254257 A1* | 12/2004 | Laginess et al. | 522/64 |
| 2005/0096427 A1* | 5/2005 | Odajima et al. | 524/755 |
| 2007/0048441 A1* | 3/2007 | Braun et al. | 427/140 |

FOREIGN PATENT DOCUMENTS

| | | |
|---|---|---|
| DE | 4328092 A1 | 2/1995 |
| DE | 4337961 A1 | 5/1995 |
| DE | 4438504 A1 | 5/1996 |
| DE | 19709467 C1 | 10/1998 |
| DE | 10042152 A1 | 3/2002 |
| DE | 100 43 810 | 4/2002 |
| DE | 10048670 A1 | 4/2002 |
| DE | 10048847 A1 | 4/2002 |
| DE | 10048849 A1 | 4/2002 |
| DE | 10048275 C1 | 5/2002 |
| DE | 102 02 565 | 8/2003 |
| DE | 10204114 A1 | 8/2003 |
| DE | 10300798 A1 | 7/2004 |
| DE | 103 16 890 | 11/2004 |
| EP | 0089497 A3 | 9/1983 |
| EP | 0228003 A1 | 7/1987 |
| EP | 0234361 A1 | 9/1987 |
| EP | 0234362 A1 | 9/1987 |
| EP | 0256540 A3 | 2/1988 |
| EP | 0260447 A3 | 3/1988 |
| EP | 0297576 A1 | 1/1989 |
| EP | 0299148 A3 | 1/1989 |
| EP | 0354261 A1 | 2/1990 |
| EP | 0394737 A1 | 10/1990 |
| EP | 0397806 B1 | 11/1990 |
| EP | 0401565 A1 | 12/1990 |
| EP | 0424705 A3 | 5/1991 |
| EP | 0521928 B1 | 1/1993 |

(Continued)

OTHER PUBLICATIONS

International Search Report for PCT/EP2006/050566 dated May 4, 2006.
English Translation of Written Opinion for PCT/EP2006/050566 filed on Jan. 28, 2006.
English Translation of International Preliminary Report of PCT/EP2006/050566 dated Oct. 3, 2007.

*Primary Examiner*—Sanza L McClendon
(74) *Attorney, Agent, or Firm*—Cantor Colburn LLP

(57) ABSTRACT

A UV-A-curable, solvent-containing composition composed of (A) 1% to 50% by weight of a UV-A-curable constituent containing isocyanate-reactive groups;
(B) 0.01% to 10% by weight of a colorless photoinitiator having an absorption maximum in the wavelength range of $\lambda=300$ to 400 nm;
(C) 10% to 70% by weight of an alkyl and/or cycloalkyl acetate having 3 to 10 carbon atoms in the alkyl radical and/or in the cycloalkyl radical;
(D) 10% to 70% by weight of an alkoxyalkyl, alkoxycycloalkyl, cycloalkoxyalkyl and/or cycloalkoxycycloalkyl acetate;
(E) 0.01% to 5% by weight of a constituent that lowers the interfacial tension;
(F) 0 to 50% by weight of an alkylaromatic having at least two alkyl radicals having 1 to 6 carbon atoms in the molecule; and
(G) 0 to 50% by weight of an additive different from constituents (A) to (F);

processes for preparing it, and its use as a spot blender in automotive refinishing, especially in spot repair, or for preparation thereof.

23 Claims, No Drawings

FOREIGN PATENT DOCUMENTS

| | | | |
|---|---|---|---|
| EP | 0522419 | A1 | 1/1993 |
| EP | 0522420 | A3 | 1/1993 |
| EP | 0523610 | A1 | 1/1993 |
| EP | 0529335 | A1 | 3/1993 |
| EP | 0531510 | B1 | 3/1993 |
| EP | 0536712 | A3 | 4/1993 |
| EP | 0543817 | B1 | 6/1993 |
| EP | 0574417 | B2 | 12/1993 |
| EP | 0578645 | B1 | 1/1994 |
| EP | 0581211 | A1 | 2/1994 |
| EP | 0584818 | A1 | 3/1994 |
| EP | 0590484 | A1 | 4/1994 |
| EP | 0593454 | B1 | 4/1994 |
| EP | 0595186 | A1 | 5/1994 |
| EP | 0596460 | A3 | 5/1994 |
| EP | 0596461 | A2 | 5/1994 |
| EP | 0634431 | A1 | 1/1995 |
| EP | 0639660 | A1 | 2/1995 |
| EP | 0649865 | A1 | 4/1995 |
| EP | 0669356 | A1 | 8/1995 |
| EP | 0678536 | A1 | 10/1995 |
| EP | 0708788 | B1 | 5/1996 |
| EP | 0817684 | B1 | 1/1998 |
| WO | WO8910387 | A3 | 11/1989 |
| WO | WO9411123 | A1 | 5/1994 |
| WO | WO9426827 | A1 | 11/1994 |
| WO | WO9514721 | A1 | 6/1995 |
| WO | WO9612747 | A1 | 5/1996 |
| WO | WO9749745 | A1 | 12/1997 |
| WO | WO9749747 | A1 | 12/1997 |

\* cited by examiner

MIXTURE CONTAINING A SOLVENT, WHICH CAN BE CURED WITH UV-A RADIATION, METHOD FOR ITS PRODUCTION, AND USE THEREOF

CROSS REFERENCE TO RELATED APPLICATIONS

This application is a National Phase Application of Patent Application PCT/EP2006/050566 filed on Jan. 28, 2006, which claims priority to DE 10 2005 012 589.1, filed Mar. 18, 2005.

The present invention relates to a new, UV-A-curable, solvent-containing composition. The present invention also relates to a new process for preparing a UV-A-curable, solvent-containing composition. The present invention further relates to the use of the new, UV-A-curable, solvent-containing composition or of the UV-A-curable, solvent-containing composition prepared by means of the new process as a spot blender in automotive refinishing.

In automotive refinishing, large damage sites are usually treated by removing the damaged parts of the bodywork and refinishing the entire area. However, for instances of minor damage, which are very annoying particularly in the case of new and/or particularly high-value vehicles, such as key scratches or knocks (for example, from the demarcation in a parking lot), for instance, this procedure is very involved and is out of proportion with the size of the damage. Minor damage is therefore removed preferably with the aid of methods of minor vehicle refinish. These methods are also referred to by those in the art as touch-up or spot repair.

The known spot repair methods, however, have numerous disadvantages and are difficult to implement. For instance, the runout zones of the clearcoat spray mist on the original finish are often too wide, which makes it more difficult to achieve a visual match between refinish and original finish. Additionally, because of the poor adhesion of the refinish clearcoat to the original finish in the runout zones around the damage site, the refinish clearcoat may break away or come off. That produces clearly visible edges which may even run all the way round the refinish clearcoat, which is located directly above the original finish. In that case the overall effect of the refinish, owing to the visually hard transition zones, is that of a "stuck-on patch".

Attempts have been made to solve the problems of the breaking away or coming off and the difficulty of matching the visual qualities in the runout zones by applying what are called spot blenders over the uncured refinish clearcoat. The purpose of this measure is to produce particularly "soft" transition zones and to prevent the refinish clearcoat coming away in the zones marginal to the original finish.

Substantial advantages have been provided here by the spot repair method known from German patent application DE 100 43 810 A1. Thus it is possible to lower the sanding and/or polishing times by more than 50% as compared with conventional methods. There is no longer any visual difference between the resultant refinishes and the original finishes. The refinish clearcoat is no longer observed to come off or break away in the runout zones. The quality of the refinishes is so high that the spot repair method in question can even be used for the spot repair of original finishes on the line at the automaker's plant. In view of the high pass rate, considerable economic advantages are achieved by this means.

Nevertheless, the spot blender used in the case of the known spot repair method is not fully capable of being used in spot repair methods which employ clearcoat materials that are curable with actinic radiation, preferably with UV radiation, and in particular with UV-A radiation (on "actinic radiation" cf. German patent application DE 103 16 890 A1, page 6, paragraph [0035]).

International patent application WO 94/11123 discloses a UV-A-curable solvent-containing composition composed of
6 to 10 parts of polyfunctional melamine acrylate,
5 to 8 parts of polyether acrylate oligomer,
9 to 12 parts of epoxy acrylate,
6 to 10 parts of ethoxylated trimethylolpropane triacrylate,
9 to 12 parts of isodecyl acrylate,
40 to 60 parts of a solvent mixture of alcohols, glycol ethers and acetates,
0.6 to 1.2 parts of p-phenylbenzophenone,
0.1 to 0.3 part of polyether-modified dimethylpolysiloxane copolymers, and
4 to 6 parts of polysiloxane polyether copolymer.

The known composition is used for producing scratchproof antifog coats.

German patent applications DE 100 48 849 A1, DE 102 02 565 A1 and DE 103 16 890 A1 disclose UV-A-curable, solvent-containing compositions that comprise
hydroxyl-containing methacrylate copolymers,
dipentaerythrityl pentaacrylate,
solvents such as butyl acetate, ethoxyethyl propionate, methyl isoamyl ketone and Solventnaphtha®,
Irgacure® 184 from Ciba Spezialitätenchemie (1-hydroxycyclohexyl phenyl ketone; white powder; absorption maxima at $\lambda=240$ to 250 nm and 320 to 335 nm)
Lucirin® TPO from BASF Aktiengesellschaft (acylphosphine oxide; yellowish powder; absorption maximum at $\lambda=380$ nm),
wetting agents, and
light stabilizers.

These mixtures are used exclusively for preparing clearcoat materials that are curable thermally and with actinic radiation (dual-cure clearcoat materials) and that can also be used as refinish clearcoat materials. The compositions are not used as spot blenders in spot repair methods.

German patent DE 197 09 467 C1 discloses UV-curable, solvent-free compositions containing, for example,
hexafunctional urethane acrylate,
hexanediol diacrylate, and
Irgacure® 184

One of the uses of these compositions is as refinish clearcoat materials. They cannot be used as spot blenders in spot repair methods.

It is an object of the present invention to provide a new, UV-A-curable, solvent-containing composition which can be used as a spot blender in spot repair methods wherein refinish clearcoat materials are used that are
curable physically,
curable thermally,
curable with actinic radiation, preferably with UV radiation, in particular with UV-A radiation, or
curable by a dual-cure mechanism,
preferably refinish clearcoat materials curable with UV-A radiation or both thermally and with UV-A radiation.

The new, UV-A-curable, solvent-containing mixture ought to make it possible to carry out, with all of these refinish clearcoat materials, spot repair methods which yield refinishes that can be sanded and/or polished within a very short time, that no longer differ visually from the original finish, that no longer exhibit any coming off or breaking away in the runout zones, and that are of such high quality that they can be used even for spot repair of original finishes on the line.

Accordingly we have found a new, UV-A-curable, solvent-containing composition comprising (A) 1% to 50% by weight of at least one UV-A-curable constituent selected from the group consisting of monomers (a1) containing at least three UV-A-curable reactive functional groups and at least one isocyanate-reactive functional group and mixtures (a2) of monomers (a21) that are free from isocyanate-reactive functional groups and contain at least two UV-A-curable reactive functional groups, and monomers (a22) that contain at least two UV-A-curable reactive functional groups and at least one isocyanate-reactive functional group;

(B) 0.01% to 10% by weight of at least one colorless or substantially colorless photoinitiator having at least one absorption maximum in the wavelength range of $\lambda=300$ to 400 nm;

(C) 10% to 70% by weight of at least one alkyl and/or cycloalkyl acetate having 3 to 10 carbon atoms in the alkyl radical and/or in the cycloalkyl radical;

(D) 10% to 70% by weight of at least one alkoxyalkyl, alkoxycycloalkyl, cycloalkoxyalkyl and/or cycloalkoxycycloalkyl acetate;

(E) 0.01% to 5% by weight of at least one constituent that lowers the interfacial tension, and (F) 0 to 50% by weight of at least one alkylaromatic having at least two alkyl radicals having 1 to 6 carbon atoms in the molecule;

(G) 0 to 50% by weight of at least one additive different from constituents (A) to (F);

this composition being referred to below as "composition of the invention".

Also found has been the new process for preparing a UV-A-curable, solvent-containing composition, which comprises mixing constituents (A) to (E) and also, where appropriate, (F) and/or (G) with one another, and then homogenizing the resulting mixture, this process being referred to below as "process of the invention".

Found additionally has been the new use of the composition of the invention or of the UV-A-curable, solvent-containing composition prepared by means of the process of the invention as a spot blender or as a substantial substituent of a spot blender in spot repair methods, this being referred to below as "use in accordance with the invention".

Further subject matter of the invention will emerge from the description.

In the light of the prior art it was surprising and unforeseeable for the skilled worker that the object on which the present invention was based could be achieved by means of the composition of the invention, the process of the invention, and the use in accordance with the invention.

In particular it was surprising that the composition of the invention could be employed in its inventive use as a spot blender or as a substantial constituent of a spot blender in spot repair methods which use refinish clearcoat materials that are
curable physically,
curable thermally,
curable with actinic radiation, preferably with UV radiation, in particular with UV-A radiation, or
curable by a dual-cure mechanism,
preferably refinish clearcoat materials curable with UV-A radiation or both thermally and with UV-A radiation.

A particular surprise was that the composition of the invention could be added as a substantial constituent to refinish clearcoat materials, which could then be used with advantage as spot blenders.

The composition of the invention made it possible, with all of these refinish clearcoat materials, to carry out spot repair methods which yielded refinishes that could be sanded and/or polished within a very short time, that no longer differed visually from the original finish, that no longer exhibited any coming off or breaking away in the runout zones, and that were of such high quality that they could be used even for spot repair of original finishes on the line.

The applicability of the composition of the invention was therefore extraordinarily broad, and the use in accordance with the invention, owing to the technical advantages for paint shops and their customers, provided significant economic advantages.

The composition of the invention could be prepared economically, easily and with very good reproducibility by means of the process of the invention.

The composition of the invention is curable with UV-A radiation. As is known, UV-A radiation is UV radiation with a wavelength range of $\lambda=300$ to 400 nm. Suitable light sources for UV-A radiation are conventional and are described for example in German patent application DE 103 16 890 A1, page 17, paragraphs [0128] to [0130], or in international patent application WO 94/11123, page 2, line 35, to page 3, line 6, page 3, lines 10 to 15, and page 8, lines 1 to 14.

The composition of the invention is composed of constituents (A), (B), (C), (D) and (E) and also, where appropriate, (F) and (G).

Constituent (A) is UV-A-curable and is present in the composition of the invention in an amount of 1% to 50%, preferably 5% to 20% and in particular 7% to 15% by weight.

Constituent (A) is selected from the group consisting of
monomers (a1) containing at least three, preferably at least four, more preferably at least five, and in particular five UV-A-curable reactive functional groups and at least one, especially one, isocyanate-reactive functional group and
mixtures (a2) of
monomers (a21) that are free from isocyanate-reactive functional groups and contain at least two, preferably at least three, more preferably at least four, and in particular four UV-A-curable reactive functional groups, and
monomers (a22) that contain at least two, preferably at least three, and in particular three UV-A-curable reactive functional groups and at least one and in particular one isocyanate-reactive functional group.

Examples of suitable UV-A-curable reactive functional groups are the reactive functional groups described in German patent application DE 103 16 890 A1, page 6, paragraphs [0035] and [0039] to [0041]. In particular, acrylate groups are used.

Examples of suitable isocyanate-reactive functional groups are hydroxyl groups, thiol groups and primary and secondary amino groups, especially hydroxyl groups.

One example of a particularly suitable monomer (a1) is dipentaerythrityl pentaacrylate.

One example of a particularly suitable mixture (a2) is the mixture of pentaerythrityl tetraacrylate (a21) and pentaerythrityl triacrylate (a22).

Constituent (B) is composed of at least one photoinitiator and preferably of at least two, in particular two, photoinitiators and is present in the composition of the invention in an amount of 0.01% to 10%, preferably 0.05% to 5% and in particular 0.05% to 3% by weight.

The photoinitiators (B) are colorless. This means that their masstone color is white (cf. Römpp Lexikon Lacke und Druckfarben, Georg Thieme Verlag, Stuttgart, N.Y., 1998, "masstone colors" and "achromatic point").

It is also possible, alternatively, for the photoinitiators (B) to be substantially colorless. This means that they have an intrinsic color of low chromaticity, such as a very pale yellow shade, for example, but one which, at the concentrations at which the photoinitiators are employed, produces no discoloration of the compositions of the invention or of the refinishes produced with them.

The photoinitiators (B) have at least one absorption maximum in the wavelength range of λ=300 to 400, preferably 320 to 390 and in particular 340 to 380 nm.

Suitable photoinitiators (B) are all conventional photoinitiators, as described for example in German patent application DE 103 16 890 A1, page 6, paragraphs [0035] and [0036], or in Römpp Lexikon Lacke und Druckfarben, Georg Thieme Verlag, Stuttgart, N.Y., 1998, "photoinitiators", provided they have the profile of properties specified above.

Examples of photoinitiators (B) which are especially suitable are 1-hydroxycyclohexyl phenyl ketone (Irgacure® 184 from Ciba Spezialitätenchemie), 2,2-dimethoxy-1,2-diphenylethan-1-one (Irgacure® 651 from Ciba Spezialitätenchemie) and diphenyl(2,4,6-trimethylbenzoyl)phosphine oxide (Darocur® 4265 from Ciba Spezialitätenchemie), particularly mixtures of Irgacure® 184 and Irgacure® 651.

Constituent (C) is selected from the group consisting of alkyl and/or cycloalkyl acetates having 3 to 10 carbon atoms in the alkyl and/or cycloalkyl radical. Examples of suitable constituents (C) are known from German patent application DE 100 43 810 A1, column 3, paragraphs [0016] to [0018]. Butyl acetate in particular is used.

Constituent (C) is present in the composition of the invention in an amount of 10% to 70%, preferably 15% to 50% and in particular 20% to 45% by weight.

Constituent (D) is selected from the group consisting of alkoxyalkyl, alkoxycycloalkyl, cycloalkoxyalkyl and/or cycloalkoxycycloalkyl acetate. Examples of suitable constituents (D) are known from German patent application DE 100 43 810 A1, column 3, paragraph [0020], to column 4, paragraph [0025]. 1-Methoxypropyl acetate in particular is used.

Constituent (D) is present in the composition of the invention in an amount of 10% to 70%, preferably 15% to 50% and in particular 20% to 45% by weight.

Constituent (E) is at least one compound that lowers the interfacial tension, in particular at least one wetting agent (cf. in this respect Römpp Lexikon Lacke und Druckfarben, Georg Thieme Verlag, Stuttgart, N.Y., 1998, "wetting agents" and "flow control agents (assistants)"). Examples of suitable wetting agents are known from German patent application DE 100 43 810 A1, column 4, paragraph [0032]. Polyether-modified methylpolysiloxanes in particular are used. They are sold under the brand name Baysilone® OL 44 by Borchers.

Constituent (E) is present in the composition of the invention in an amount of 0.001% to 5%, preferably 0.005% to 2% and in particular 0.05% to 1% by weight.

The composition of the invention may contain up to 50% by weight of constituent (F). Constituent (F) is selected from the group consisting of alkylaromatics having at least two alkyl radicals having 1 to 6 carbon atoms in the molecule. Examples of suitable constituents (F) are known from German patent application DE 100 43 810 A1, column 4, paragraph [0027]. Xylene in particular is used. Constituent (F) is present in the composition of the invention in an amount of preferably 5% to 50%, more preferably 10% to 30% and in particular 10% to 25% by weight.

The composition of the invention may further comprise up to 50% by weight of at least one additive (G) other than constituents (A) to (F). The additives (G) are preferably selected from the group consisting of light stabilizers, such as UV-absorbers and reversible free-radical scavengers (HALS); antioxidants; customary paint solvents; biocides; and thermal crosslinking catalysts. The amount of additive (G) that is used may therefore vary very widely from one additive (G) to another. Thermal crosslinking catalysts are preferably used, more preferably catalysts of the reaction of isocyanate groups with isocyanate-reactive functional groups, and very preferably bismuth compounds and/or tin compounds, especially dibutyltin dilaurate.

These catalysts for the reaction of isocyanate groups with isocyanate-reactive functional groups are used preferably in the compositions of the invention that are employed as spot blenders in spot repair methods that employ thermally curable or dual-cure refinish clearcoat materials which have been prepared from polyisocyanate-containing multicomponent systems, especially two-component systems. In such cases the catalyst (G) is present in the composition of the invention in an amount of 0.01% to 2%, preferably 0.03% to 1% and in particular 0.05% to 0.5% by weight.

Where the compositions of the invention, alternatively, are used as spot blenders in spot repair methods that employ one-component refinish clearcoat materials that are curable physically, thermally, with actinic radiation or by a dual-cure mechanism, there is no need for the catalysts (G).

The composition of the invention is preferably prepared by means of the process of the invention. The process of the invention involves mixing the above-described constituents (A) to (E) and also, where appropriate, (F) and/or (G) with one another, and then homogenizing the resulting mixture. Preference is given in this context to using the conventional mixing techniques and apparatus such as stirred tanks, agitator mills, extruders, compounders, Ultraturrax, inline dissolvers, static mixers, micromixers, toothed-wheel dispersers, pressure-release nozzles and/or microfluidizers, preferably in the absence of actinic radiation.

The composition of the invention may serve per se for numerous end-use applications. In particular, in the context of its use in accordance with the invention, it is employed as spot blender in a spot repair method or for preparing such a spot blender.

The spot repair method of the invention encompasses the following steps:

(1) cleaning the damage site and its surroundings,
(2) sanding and recleaning the damage site,
(3) if desired, filling, sanding and cleaning the damage site,
(4) applying a surfacer and flashing off the resulting surfacer film, or alternatively curing the surfacer film and sanding and cleaning the resultant surfacer coat,
(5) applying a basecoat material to the surfacer film or surfacer coat, flashing off the resulting basecoat film and removing any overspray,
(6) applying a clearcoat material wet-on-wet to the basecoat film,
(7) applying a spot blender, and
(8) curing the applied films.

For the spot repair method of the invention it is advantageous for the basecoat material to be applied hidingly by pneumatic application, using a spray gun, from the outside, i.e., from the original finish, toward the inside, i.e., toward the center of the damage site. Additionally it is important for the spot blender used to be the composition of the invention described in detail above.

For the pneumatic application of the coating materials it is possible to use spray guns that are conventional per se. In accordance with the invention, alternatively, it is advantageous to use smaller spray guns than the conventional spray guns. Small-sized spray guns of this kind are available from SATA, Kornwestheim, under the trade name SATA minijet 2 HVLP SR (spot repair).

For the cleaning and the sanding it is possible to use the cleaning equipment, cleaning fluids, and sanding and/or polishing devices of the kind that are customarily used for automotive refinishing.

For the filling it is possible to employ conventional knifing fillers, especially UV-curable knifing fillers, such as those from BASF Coatings AG.

Suitable surfacers include conventional aqueous and solventborne surfacers, such as are described for example in patents and patent applications U.S. Pat. No. 4,537,926 A, EP 0 529 335 A 1, EP 0 595 186 A 1, EP 0 639 660 A 1, DE 44 38 504 A 1, DE 43 37 961 A 1, WO 89/10387, U.S. Pat. No. 4,450,200 A, U.S. Pat. No. 4,614,683 A or WO 94/26827. It is also possible to use UV-curable surfacers.

The surfacers are commercially customary products, which are sold for example by BASF Coatings AG under the brand name Glasurit® 1K-Grundfüller [one-component primer-surfacer] 76-71.

Examples of suitable solventborne or aqueous basecoat materials are known from patent applications EP 0 089 497 A 1, EP 0 256 540 A 1, EP 0 260 447 A 1, EP 0 297 576 A 1, WO 96/12747, EP 0 523 610 A 1, EP 0 228 003 A 1, EP 0 397 806 A 1, EP 0 574 417 A 1, EP 0 531 510 A 1, EP 0 581211 A 1, EP 0 708 788 A 1, EP 0 593 454 A 1, DE-A-43 28 092 A 1, EP 0 299 148 A 1, EP 0 394 737 A 1, EP 0 590 484 A 1, EP 0 234 362 A 1, EP 0 234 361 A 1, EP 0 543 817 A 1, WO 95/14721, EP 0 521 928 A 1, EP 0 522 420 A 1, EP 0 522 419 A 1, EP 0 649 865 A 1, EP 0 536 712 A 1, EP 0 596 460 A 1, EP 0 596 461 A 1, EP 0 584 818 A 1, EP 0 669 356 A 1, EP 0 634 431 A 1, EP 0 678 536 A 1, EP 0 354 261 A 1, EP 0 424 705 A 1, WO 97/49745, WO 97/49747, EP 0 401 565 A 1 or EP 0 817 684, column 5, lines 31 to 45. Use may also be made of the basecoat materials based on the mixer system that is described in European patent application EP 0 578 645 A 1.

The basecoat materials are commercially customary products, which are sold for example by BASF Coatings AG under the brand names Glasurit® Decklack-Reihe [topcoat series] 55 with Glasurit® Einstellenzusatz [standardizer additive] 352-91 or Glasurit® Decklack-Reihe 90 with Glasurit® Einstellenzusatz 93-E 3 and Glasurit® Beispritzlack [blending varnish] 90-M5 in accordance with European patent application EP 0 578 645 A 1.

It is a very particular advantage of the composition of the invention and of its use in accordance with the invention that as part of the spot repair method of the invention it is possible to use refinish clearcoat materials that are curable physically, curable thermally, curable with actinic radiation, preferably with UV radiation, in particular with UV-A radiation, or curable by a dual-cure mechanism, preferably refinish clearcoat materials that are curable with UV-A radiation or both thermally and with UV-A radiation (dual cure).

For the purposes of the present invention the term "physical curing" denotes the curing of a film of a refinish clearcoat material by film formation, with linking within the film taking place via looping of the polymer molecules of the binders that are present. Alternatively film formation takes place via the coalescence of binder particles (cf. Römpp Lexikon Lacke und Druckfarben, Georg Thieme Verlag, Stuttgart, N.Y., 1998, "curing", pages 274 and 275). Thus the physical curing and also where appropriate the curing of the refinish clearcoat materials may be assisted by means of heat or by means of exposure to actinic radiation.

The thermally curable refinish clearcoat materials may be self-crosslinking and/or externally crosslinking.

For the purposes of the present invention the term "self-crosslinking" refers to the capacity of a binder that is present in the refinish clearcoat material (regarding the term "binder" cf. Römpp Lexikon Lacke und Druckfarben, Georg Thieme Verlag, Stuttgart, N.Y., 1998, "binders", pages 73 and 74) to undergo crosslinking reactions with itself. A precondition for this is that the binders already include both kinds of complementary reactive functional groups which are necessary for crosslinking, or reactive functional groups which react "with themselves".

Externally crosslinking refinish clearcoat materials, on the other hand, are those in which one kind of the complementary reactive functional groups is present in the binder and the other kind is present in a curing or crosslinking agent. For further details of this, refer to Römpp Lexikon Lacke und Druckfarben, Georg Thieme Verlag, Stuttgart, N.Y., 1998, "curing", pages 274 to 276, especially page 275, bottom. Examples of suitable complementary reactive functional groups are known from patent application DE 100 42 152 A1, page 7, paragraph [0078], to page 9, paragraph [0081].

The refinish clearcoat materials may also be curable only with actinic radiation. In that case curing takes place via the above-described groups which contain bonds which can be activated with actinic radiation.

The refinish clearcoat materials are preferably curable thermally and with actinic radiation.

Examples of suitable UV-curable refinish clearcoat materials are known from German patent DE 197 09 467 C 1.

The dual-cure refinish clearcoat materials are preferably prepared from multicomponent systems, especially two-component systems, which comprise polyisocyanates as curing agents. Examples of suitable dual-cure refinish clearcoat materials are known from German patent applications DE 103 16 890 A1, DE 103 00 798 A1, DE 102 02 565 A1, DE 100 42 152 A1, DE 102 04 114 A1, DE 100 48 847 A1, DE 100 48 849 A1, DE 100 48 275 A1 or DE 100 48 670 A1. One example of an especially suitable dual-cure refinish clearcoat material is that prepared from the multicomponent system, sold by BASF Coatings AG, that includes 2K [two-component] UVA clearcoat, Glasurit® VOC-Decklack-Härter [VOC topcoat hardener] code 929-31 and Glasurit® standardizer additive 352-91.

A further very particular advantage of the composition of the invention and of its use in accordance with the invention is that as part of the spot repair method of the invention the composition of the invention can be added to each of the refinish clearcoat materials used, and then the resultant mixtures can in turn be employed as spot blenders. This results in outstanding adhesion of the spot blender to the refinishes and to the original finishes.

The thermal curing of the coating materials that are applied in the spot repair method of the invention and of the applied composition of the invention has no peculiarities but instead takes place with conventional apparatus, such as fan heaters and radiant heaters which emit near and far infrared. The temperatures employed and the duration of heating are guided by the requirements of the case in hand, in particular by the reactivity of the thermally curable constituents, and can easily be selected and adjusted by the skilled worker on the basis of his or her general art knowledge and skill in the art.

The curing of the dual-cure refinish clearcoat materials that are applied in the spot repair method of the invention and of the applied composition of the invention with UV-A radiation likewise has no special features but instead takes place using the conventional light sources as described at the outset. Shadow zones can be exposed using aluminum foils as mirrors or reflectors. The duration of exposure and the irradiated dose are guided by the requirements of the case in hand, in particular by the reactivity of the UV-A-curable constituents, and can easily be selected and adjusted by the skilled worker on the basis of his or her general art knowledge and skill in the art.

The UV-A light sources may be conventionally provided with filters, so that applied dual-cure refinish clearcoat materials can be cured in alternation with IR radiation, i.e., thermally, and with UV-A radiation.

The spot repair method of the invention is suitable in particular for the spot repair of damage up to 4 to 5 cm in diameter. The damage site should be free from deformations such as dents, scratches or stonechips. Spot repair on vertical surfaces is particularly advisable. In the case of horizontal surfaces, the spot repair method is employed advantageously in the vicinity of edges (at a distance of up to 15 cm).

The use in accordance with the invention and the spot repair method of the invention yield refinishes that can be sanded and/or polished within a very short time, that no longer differ visually from the original finish, that no longer exhibit any coming off or breaking away in the runout zones, and that are of such high quality that they can be used even for spot repair of original finishes on the line.

A complete surprise here is the outcome whereby, by virtue of the use in accordance with the invention and the spot repair method of the invention, it is possible to avoid completely matting and similar paint defects of refinish basecoats which contain platelet-shaped aluminum effect pigments.

EXAMPLES

Example 1

The Preparation of the UV-A-Curable, Solvent-Containing Composition 1

In a suitable stirred vessel, in the absence of actinic radiation, 36 parts by weight of butyl acetate, 36 parts by weight of 1-methoxypropyl acetate, 16.4 parts by weight of xylene, 0.3 part by weight of wetting agent (Baysilone® OL 44 from Borchers, 10 percent strength), 10 parts by weight of dipentaerythrityl pentaacrylate, 0.1 part by weight of 2,2-dimethoxy-1,2-diphenylethan-1-one (Irgacure® 651 from Ciba Spezialitätenchemie), 0.2 part by weight of 1-hydroxy-cyclohexyl phenyl ketone (Irgacure® 184 from Ciba Spezialitätenchemie) and 1.0 part by weight of dibutyltin dilaurate (10 percent strength) were mixed with one another and the resulting mixture was homogenized. The resulting composition 1 could without problems be stored and transported to users in the absence of actinic radiation. It was outstandingly suitable as a spot blender for spot repair methods using a wide variety of refinish clearcoat materials.

Example 2

Spot Repair

Paint Damage:
The damage site for repair was a 4 to 5 cm long scratch in an automobile door with a silver metallic finish, the scratch having been caused by a key and extending in places right down to the substrate.

Actions:
The apparatus, materials and steps indicated below were applied in the order stated.

Cleaning:
1. spray can with Teroson® intensive screen cleaner
2. finish control spray 55535 from 3M
3. spray bottle with nitro thinner M600 from Akzo
4. Kimberley Clark Classic® cleaning cloths Sanding:
Lackpfeile® paint file
Schleifblüte® P 1500 sanding pad from 3M Filling:
knifing filler from BASF Coatings AG
flash-off time: 10 minutes/20° C.
sanding: wet (spray bottle) with Schleifblüte® P 1000 sanding pad from 3M Masking:
paper and masking tape from 3M Basecoat:
Glasurit® two-coat topcoat 90 line with silver-metallic effect from BASF Coatings AG
spray gun: SATA minijet 2 HVLP SR; spray pressure: 1.5 bar damage site is sprayed hidingly from the outside toward the center, running out extensively into the surrounding area
flashing off: two to three minutes after each spraying operation wiping with dust-binding cloth UV-A-Curable Clearcoat:
Glasurit® 2K UVA clearcoat and Glasurit® VOC topcoat hardener code 929-31 in a 2:1 ratio+10% Glasurit® standardizer additive 352-91
spray gun: SATA minijet 2 HVLP SR; spray pressure: 1.5 bar damage site is sprayed from the outside toward the center, running out extensively in two spray operations into the surrounding area
flashing off: two to three minutes after each spraying operation UV-A-Curable Spot Blender:
composition 1 from example 1
spray gun: SATA minijet 2 HVLP SR; spray pressure: 1.5 bar spot blender sprayed over the runout zones of the clearcoat Curing:

In Succession:
1. thermal curing with shortwave infrared radiation for three minutes
2. radiation curing with UV-A radiation (dose: 4 000 mJ/cm$^2$)

The resultant refinish was polishable immediately, being very easy to polish, and its visual and mechanical match with the original finish was outstanding. No matting or other paint defects were observed.

The invention claimed is:
1. A UV-A-curable, solvent-containing composition comprising
(A) 1% to 50% by weight of at least one UV A curable constituent selected from the group consisting of monomers (a1) comprising at least three UV A-curable reactive functional groups and at least one isocyanate-reactive functional group and mixtures (a2) of monomers (a21) that are free from isocyanate-reactive functional groups and comprise at least two UV-A-curable reactive functional groups, and monomers (a22) that comprise at least two UV A curable reactive functional groups and at least one isocyanate-reactive functional group;
(B) 0.01% to 10% by weight of at least one colorless or substantially colorless photoinitiator having at least one absorption wavelength maximum of 300 to 400 nanometers;
(C) 10% to 70% by weight of at least one alkyl and/or cycloalkyl acetate having 3 to 10 carbon atoms in the alkyl radical and/or in the cycloalkyl radical;
(D) 10 to 70% by weight of at least one alkoxyalkyl, alkoxycycloalkyl, cycloalkoxyalkyl and/or cycloalkoxycycloalkyl acetate;
(E) 0.001% to 5% by weight of at least one constituent that lowers the interfacial tension; and
(F) 0 to 50% by weight of at least one alkylaromatic having at least two alkyl radicals having 1 to 6 carbon atoms in the molecule.

2. The composition of claim 1, wherein the monomer (a1) comprises at least four UV-A-curable reactive functional groups.

3. The composition of claim 2, wherein the monomer (a1) comprises one isocyanate-reactive functional group.

4. The composition of claim 1, wherein the monomer (a21) comprises at least three UV A-curable reactive functional groups.

5. The composition of claim 1, wherein the monomer (a22) comprises one isocyanate-reactive functional group.

6. The composition of claim 4, wherein the monomer (a21) comprises at least four UV A-curable reactive functional groups.

7. The composition of claim 1, wherein the UV A curable reactive functional groups are acrylate groups.

8. The composition of claim 1, wherein the isocyanate-reactive functional groups of monomers (a1) and (a22) are hydroxyl groups.

9. The composition of claim 1, comprising (A) in an amount of 5% to 20% by weight.

10. The composition of claim 1, comprising (B) in an amount of 0.05% to 5% by weight.

11. The composition of claim 1, wherein (B) has at least one absorption wavelength maximum of 320 to 390 nanometers.

12. The composition of claim 1, comprising (C) in an amount of 15% to 50% by weight.

13. The composition of claim 1, comprising (D) in an amount of 15% to 50% by weight.

14. The composition of claim 1, comprising (F) in an amount of 10 to 30% by weight.

15. The composition of claim 1, comprising (E) in an amount of 0.005% to 2% by weight.

16. A method of manufacturing the UV A-curable, solvent-containing composition of claim 1, comprising mixing (A) to (F) to produce a homogeneous mixture.

17. The method of claim 16, wherein the method is carried out in the absence of actinic radiation.

18. A UV A-curable spot blender for automotive refinishing, comprising the UV-A-curable, solvent-containing composition of claim 1.

19. The UV-A-curable spot blender of claim 18, further comprising a refinish clearcoat material.

20. A UV-A-curable, solvent-containing composition comprising
(A) 1% to 50% by weight of at least one UV A curable constituent selected from the group consisting of monomers (a1) comprising at least three UV A-curable reactive functional groups and at least one isocyanate-reactive functional group and mixtures (a2) of monomers (a21) that are free from isocyanate-reactive functional groups and comprise at least two UV-A-curable reactive functional groups, and monomers (a22) that comprise at least two UV A curable reactive functional groups and at least one isocyanate-reactive functional group;
(B) 0.01% to 10% by weight of at least one colorless or substantially colorless photoinitiator having at least one absorption maximum in the wavelength range of $\lambda=300$ to 400 nm;
(C) 10% to 70% by weight of at least one alkyl and/or cycloalkyl acetate having 3 to 10 carbon atoms in the alkyl radical and/or in the cycloalkyl radical;
(D) 10% to 70% by weight of at least one alkoxyalkyl, alkoxycycloalkyl, cycloalkoxyalkyl and/or cycloalkoxycycloalkyl acetate;
(E) 0.001 to 5% by weight of at least one constituent that lowers the interfacial tension;
(F) 0 to 50% by weight of at least one alkylaromatic having at least two alkyl radicals having 1 to 6 carbon atoms in the molecule; and
(G) 0.01 to 2% by weight of at least one catalyst for the reaction between isocyanate groups and isocyanate-reactive functional groups.

21. The UV-A-curable, solvent-containing composition of claim 20, wherein the at least one catalyst is selected from the group consisting of bismuth compounds and tin compounds.

22. A method of spot repairing paint finishes comprising
(A) applying a basecoat material to a substrate;
(B) applying a clearcoat material wet-on-wet to the basecoat film;
(C) applying the UV-A-curable, solvent-containing composition of claim 1; and
(D) curing the applied films.

23. The method of claim 22, wherein the basecoat material comprises at least one platelet-shaped aluminum effect pigment, and the clearcoat material comprises is curable with UV-A radiation, or both thermally and with UV-A radiation.

* * * * *